Figure 1:
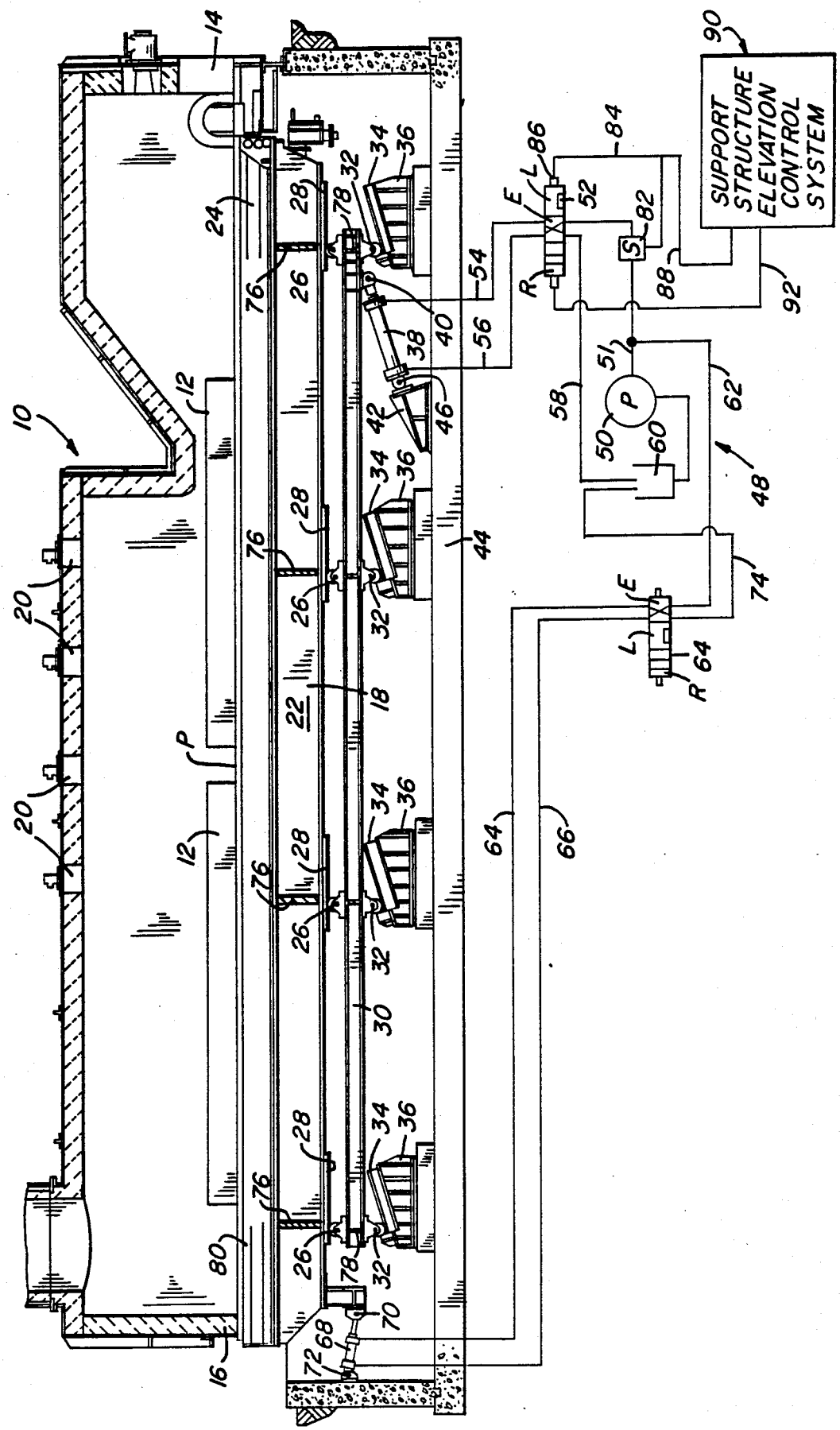

United States Patent [19]
Bricmont

[11] Patent Number: 4,919,254
[45] Date of Patent: Apr. 24, 1990

[54] WALKING BEAM APPARATUS AND METHOD

[75] Inventor: Francis H. Bricmont, Pittsburgh, Pa.

[73] Assignee: Bricmont & Associates, Inc., McMurray, Pa.

[21] Appl. No.: 151,027

[22] Filed: Feb. 1, 1988

[51] Int. Cl.$^5$ .............................................. B65G 25/00
[52] U.S. Cl. .................................... 198/751; 198/776
[58] Field of Search ...................... 198/751, 774–776, 198/505; 432/239; 414/750

[56] References Cited

U.S. PATENT DOCUMENTS

| | | | |
|---|---|---|---|
| 2,275,433 | 3/1942 | Herold et al. | 198/776 |
| 3,815,726 | 6/1974 | Klein | 198/751 |
| 3,871,534 | 3/1975 | Bursk | 198/776 |
| 3,887,064 | 6/1975 | Brockmann | 198/776 |
| 4,330,262 | 5/1982 | Kranzl et al. | 198/774 |
| 4,723,909 | 2/1988 | Kouvet | 198/774 |

Primary Examiner—Joseph E. Valenza
Attorney, Agent, or Firm—Clifford A. Poff

[57] ABSTRACT

A walking beam apparatus such as used in a reheat furnace for processing of steel slabs wherein a walking beam transfer structure includes a traversing beam assembly which is moveable both vertically and horizontally to contact, support, and laterally traverse a load through a given increment of distance, and a support beam assembly which supports such a load when not supported by the walking beam assembly, and which support is moveable at least vertically to move out of supporting engagement with the load upon attainment of supporting engagement thereof by the walking beam assembly, whereby the load is supported continuously in a predetermined, substantially horizontal plane throughout repeated operating cycles of the apparatus.

24 Claims, 3 Drawing Sheets

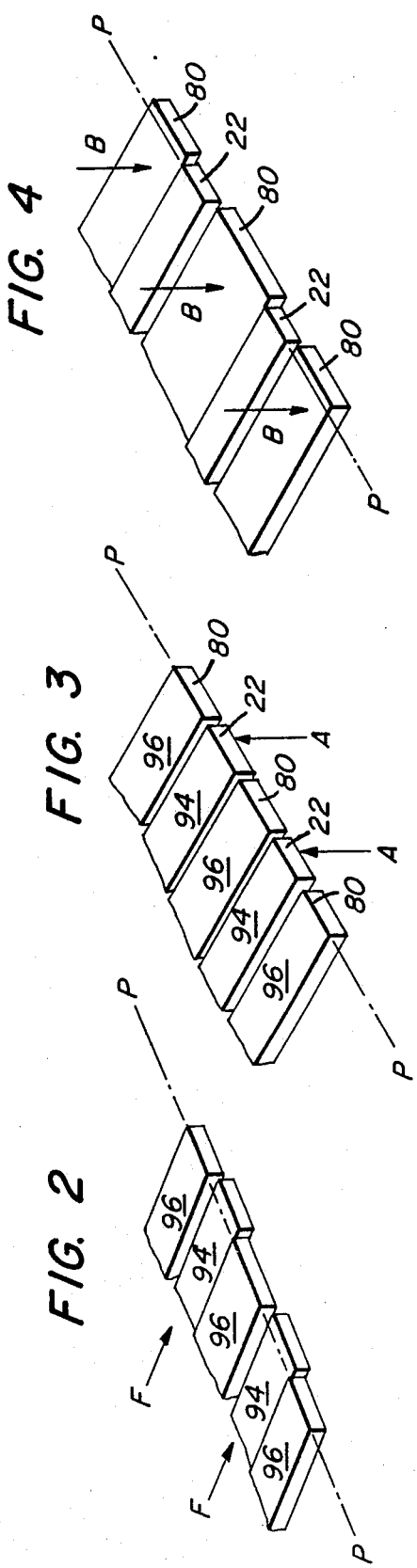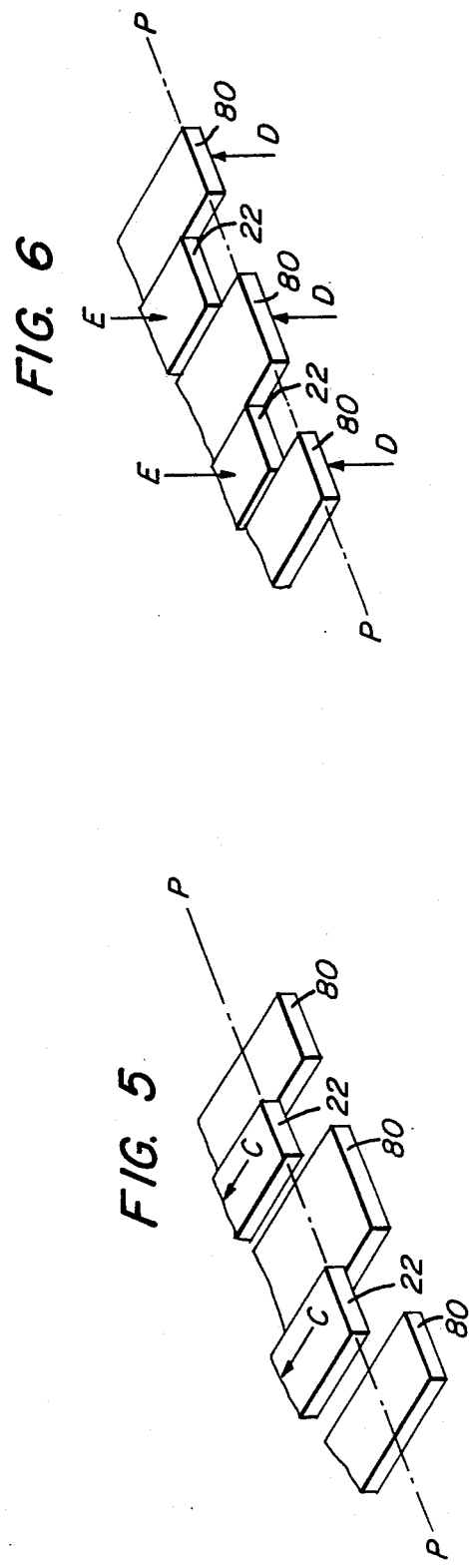

WALKING BEAM APPARATUS AND METHOD

BACKGROUND OF THE INVENTION

This invention relates to a method and apparatus for transferring objects generally in a rectalinear path through a given distance. For example, in the field of steel making it is well known to utilize reheat furnaces for the purpose of heating steel slabs to maintain the slabs at a hot working temperature during rolling operations. Such reheat furnaces often have been characterized as walking-beam furnaces as a reference to the structural arrangement by which the steel slabs are supported and moved through the furnace from the charge to the discharge end thereof.

Of course, it will be appreciated that the references herein to walking beam type reheat furnaces are exemplary in nature and that the invention is not limited to use in a walking beam furnace or in steel making generally, but may be applied in any of a wide variety of applications which require movement of an article or articles along a rectilinear path to achieve the ends of a given manufacturing process or operation. This being understood, the invention will be described specifically with reference to a walking-beam type reheat furnace for purposes of convenient description.

In conventional walking-beam reheat furnaces, the slabs or billets to be heated are spaced one from another and the furnace is provided with first and second support structures, one of which is stationary and the other which is moveable through a sequence of well known motions to produce, by repetition of the sequence of motions, a "walking" translational motion. More specifically, in a conventional walking beam type furnace, the walking beam assembly includes movable slab support beams with support surfaces which initially are located at an elevation below the elevation of the stationary slab support surfaces, and are therefore disengaged from the slabs. The slab support beams are moved vertically upward to engage the slabs and lift them from the stationary support surfaces, after which the walking beam assembly is actuated to move the slab supporting beams, and therefore the slabs themselves, laterally in rectalinear translational motion through a given distance. The walking beam assembly is then further actuated to lower the slabs once again onto the stationary support beams, and is then lowered further to disengage the walking beam support surfaces from the slabs so that the slabs are again supported entirely by the stationary support beams. The walking beams assembly may then be further actuated to retract the laterally moveable elements thereof to their initial position to repeat the above described cycle thereby achieving the well known "walking" translational motion.

Any of a variety of mechanical systems may be employed to impart the desired cycles of vertical and lateral motion to a walking beam structure, including but not limited to screw jacks or hydraulic jacks, cams or eccentric drives, inclined plane arrangements, rack and pinion arrangements, and others used individually or in combination to produce the desired motion. Any of these, and others, may be employed to produce the desired mechanical motion in the present invention as hereinbelow described.

Although prior walking beam arrangements such as above characterized have generally served their intended purpose, there remains in the art considerable motivation, due to pressures of competition, escalating energy costs and other inflationary pressures for example to develop improved walking beam systems and similar work piece translating apparatus.

BRIEF SUMMARY OF THE INVENTION

The present invention contemplates a novel and improved walking beam translation method and apparatus which may be utilized in a reheat furnace or the like, wherein an otherwise stationary slab supporting structure is provided with the capability to alter the vertical elevation of the support surfaces thereof, on which slabs may be supported, such that the slabs may be translated laterally by a cooperating walking beam assembly at substantially the same vertical elevation where they are supported by the stationary beam assembly. Therefore, according to the invention, it is not necessary for the walking beam assembly to vertically raise and lower slabs or other workpieces in conjunction with translational movement thereof. Reduced capital cost for the walking beam structure results, greatly simplifying the design thereof and saving in addition a great deal of motive energy which in conventional walking beam furnaces has been expended in repeatedly raising the slabs above the elevation of the stationary beam structure for translation thereof.

In order to provide such improved operation, one preferred embodiment of this invention includes suitable sensor or detector means for detecting partial supporting engagement of the slabs by the walking beam assembly support surfaces during upward movement of the walking beam assembly, and actuator or control means to discontinue upward movement of the walking beam assembly and to lock the same at the established vertical elevation immediately upon detection of such partial supporting engagement with the slabs. Similarly, after translation of the slabs by the walking beam assembly, other sensors detect engagement of the slabs on the stationary, or more correctly the non-translating support beam assembly, upon raising thereof, whereby support of the slbas is transferred again to the nontranslating beam structure. Throughout repeated cycles of the walking beam apparatus operation, the support of the slabs is thus transferred repeatedly between the translating and non-translating beam assembly while the slabs remain at all times substantially at a fixed elevation.

It is therefore an object of the present invention to provide a novel and improved method and apparatus to fulfill a walking-beam type article translating function.

A more specific object of the invention is to provide a method and apparatus to fulfill a walking beam type translation function wherein the articles translated thereby are maintained substantially at a constant elevation throughout repeated cycles of the translational motion.

Of course, these objects may be realized in a structure having two sets of walking beam assemblies which operate in phased relationship such that one walking beam structure supports slabs or other workpieces and translates the same through a given distance while the other walking beam assembly is retracted and readied to assume support of the slabs and move the same through a further increment of translational motion. This dual walking beam structure is an alternative embodiment of the invention.

In another presently preferred embodiment of the invention, mechanical stops are utilized rather than load detection devices to ensure the support surfaces of the walking beam apparatus are positioned precisely at the desired elevation to support the workpieces for translation thereof without resorting to any unnecessary lifting of the workpieces above the plane of translation.

Of course it will be appreciated that the workpieces commonly processed through a reheat furnace or similar apparatus on a walking beam assembly are extremely heavy. Even though the walking beam apparatus is designed to be fully adequate to the task of moving the massive workpieces through the furnace, it may be nevertheless tha the workpieces are not maintained precisely on a uniform plane of translation owing to such factors as the innate, though slight, compressability of hydraulic fluid in a hydraulically powered system, or the inevitable elastic deformations, however slight, of the walking beam structure under the massive loads imposed thereon. As a practical matter, the repeated cycles of walking beam operation in accordance with this invention may result in accumulation of incremental discrepancies between actual workpiece elevation and the elevation of the desired horizontal translation plane. Accordingly, it will be understood that in the practice of this invention some very slight lifting of the workpieces may occur in given cycles of operation. It is to be understood that, apart from this possibility, it is one object of the invention to provide a walking beam system which effectively avoids unnecessary and unproductive lifting of the workpieces during the repeated cycles of translational motion.

Figure 7:
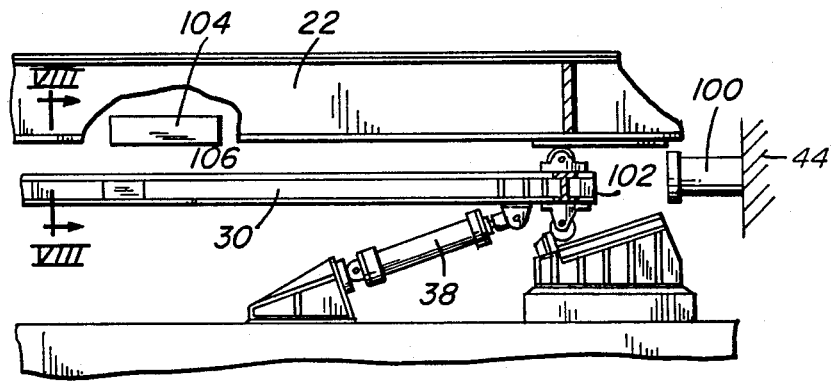
Figure 8:
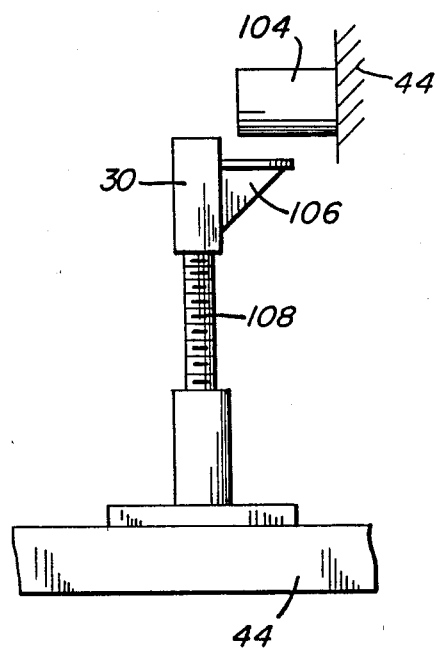

These and other objects and further advantages of the invention will be more readily appreciated upon consideration of the following detailed description and the accompanying drawings, in which:

FIG. 1 is a sectioned side elevation of a reheat furnace showing one embodiment of a walking beam arrangement constructed according to principles of the present invention;

FIGS. 2 through 6 inclusive, schematically illustrate the operating cycle of the walking beam structure of FIG. 1;

FIG. 7 is a fragmentary schematic view showing elements of an alternative embodiment of the invention; and FIG. 8 is a schematic sectional view taken on line VIII—VIII of FIG. 7.

There is generally indicated at 10 FIG. 1 a reheat furnace such as is often used in steel making operations to reheat slabs of steel 12 to keep them at suitable hot working temperature throughout rolling thereof. Accordingly, furnace 10 includes an entry or charging opening 14 where slabs 12 enter the furnace from a prior forming operation such as rolling, an exit or discharge opening 16 through which slabs 12 leave furnace 10 to proceed to a further rolling operation, and a walking beam traversing apparatus 18 which is operable to translate the slabs 12 through the length of furnace 10 from entry 14 to exit 16. As is well known, plural burners 20 are provided in the roof of furnace 10 to provide thermal energy for reheating the slabs 12 passing therethrough such that each slab 12 exiting the furnace will be at a suitably elevated temperature for further roll forming thereof.

Walking beam apparatus 18 may comprise, as shown, an elongated support and traversing beam structure 22 which carries thereon a slab supporting platform 24 constructed of refractory material, for example. The support and traversing beam 22 is supported upon rollers 26 which engage tracks or roll pads 28 affixed to an under surface of beam 22. The rollers 26 are rotatably carried by an elongated idler beam 30 which underlies and is generally co-extensive with an elongated portion of beam 22.

Beam 30 is in turn supported by engagement of rollers 32 rotatably carried thereby upon inclined tracks or roll pads 34 which are supported as by fabricated foundation block structures 36 to reside at a common angle of inclination to the horizontal such that longitudinal traversing of idler beam 30 causes it to ride up or down the inclined planes defined by tracks or pads 34. Such longitudinal traversing of idler beam 30 is controlled by selectively operable hydraulic jacks or rams 38 which are pivotally affixed adjacent opposite longitudinal ends thereof to idler beam 30 as at 40, and to a stationary structure such as a fabricated member 42 as shown at 46. Member 42 is affixed to a stationary base portion 44 of furnace 10.

Jacks 38 are powered by a hydraulic power system 48 having a pump 50 which delivers hydraulic fluid under pressure via a conduit 51 and a three-position hydraulic control valve 52 selectively to one end or the other of Jacks 38 by respective supply/return lines 54 and 56. A return line 58 carries return fluid flow from valve 52 to a resevoir 60.

Hydraulic power system 48 also supplies motive fluid flow via a supply conduit 62 and a three-position hydraulic control valve 64, similar to valve 52, and a pair of supply/return conduits 64 and 66, to a hydraulic jack or ram 68 for purposes of traversing beam assembly 22 laterally to and fro on rollers 26. Accordingly, ram 68 is pivotally affixed adjacent its opposite ends to beam assembly 22 as to 70, and to a clevis member affixed to furnace base 44 as at 72. A return conduit 74 carries return hydraulic fluid flow from valve 64 to resevoir 60.

Of course, it will be appreciated that the above described walking beam structure is not necessarily a single support beam 22 and idler beam 30, with related component as described. Rather, a plurality of such walking beam structures may be disposed side by side and rigidly connected together as by cross members 76 and 78. Of course, suitable hydraulic drive cylinders such as above described are also duplicated for each of the plural beam assemblies, all preferably being driven by a common hydraulic power system such as system 48.

It will be seen from the above description that the operation of walking beam structure 18 entails repeated cycles of elevation through actuation of ram 38 to elevate beam 22 and thereby support the slabs 12 on a support structure for translation through actuation of ram 68 to traverse beam 22 longitudinally of the furnace in one direction, retraction of ram 38 to lower beam 22 and thereby transfer support of slabs 12 to the stationary support structure once again, and extension of ram 68 to complete the cycle by traversing beams 22 longitudinally with respect to the furnace 10 in the opposite longitudinal direction thereby returning beams 22 to the initial position.

It will be recalled that in conventional reheat furnaces the repeated cycles of walking beam motion have uniformly involved elevation of the walking beam to an elevation above the work support plane P of a support structure 80 (FIGS. 2–6), thereby requiring the entire load of slabs 12 to be lifted prior to longitudinal translation, and to be lowered again onto plane P for support thereof on surfaces 96 of support structure 80 at the end of longitudinal translation. According to the present invention, the walking beam structure 18 is not required to lift slabs 12 above plane P during its repeated cycles of walking motion, whereby considerable energy costs which would result from repeated unproductive lifting of the slabs 12 are avoided. Additionally, in conventional furnaces the repeated lifting of steel slabs from a support structure prior to translational motion and lowering thereof onto the support structure again after the translational motion has resulted in repeated undesirable impact loadings as the slabs 12 are engaged alternately by the support surfaces of the refractory platforms carried by walking beam 22 and the support structure 80. In the present invention, such impact loading is reduced to a minimum and effectively eliminated, to the distinct benefit of the service life of the refractory materials utilized in the support platforms, the structural integrity and design requirements of the underlying support and walking beam structures, and the drive and traversing systems utilized.

To achieve these ends, the embodiment of FIG. 1 is provided a sensor or detector means for detecting partial supporting contact between support surfaces 94 of walking beams 22 and slabs 12 during elevation of the walking beam 22. The sensor or detector is operative to discontinue upward motion of the walking beam structure upon detecting upon contact whereby repeated non-productive lifting of slabs 12 is eliminated. In order to then transfer the full weight of slabs 12 to the walking beams structure, the walking beam 22 is locked in position with the support surface 94 in partial supporting contact with slabs 12 substantially at the elevation of plane P, and the supporting structure 80 is lowered to transfer the entire load of slabs 12 onto walking beam structure 22. In order to accomplish this, support structure 80 is, of course, provided with a powered elevating and lowering system which may be identical to the above-described hydraulic power system for elevating and lowering the walking beam 22.

Referring more specifically to the embodiment shown in FIG. 1, a sensor or detector may take the form of a pressure actuated switch 82, for example, and may be located to detect the pressure of hydraulic fluid in conduit 51. Valve 52 may take any of a variety of forms, but as shown in a three-position valve including a retract position R, an extend position E and a lock position L. In the lock position, the fluid system comprised of ram 38 and supply/return conduits 54 and 56 is isolated from the rest of the hydraulic power system so that walking beam 22 is maintained substantially at a fixed elevation. A suitable control conduit 84 connects sensor 82 with a control port 86 on valve 52 to permit actuation of valve 52 to the lock (L) position under predetermined conditions, such as when increasing pressure in supply line 51 reaches a magnitude indicative of contact and partial support of slabs 12 by walking beam 22. Thus, upon actuation of valve 52 to the extend (E) position, ram 38 is extended to elevate walking beam 22 until contact of the surfaces 94 with slabs 12 results in a sharp increase of the fluid pressure in conduit 51 which is detected by sensor 82. In response thereto, a control signal is passed via control line 84 to actuating port 86 to shift valve 52 to the lock (L) position thereby locking walking beam structure 18 at the elevation of plane P.

At the same time, the control signal from detector 82 is provided via a control line 88 to a support structure elevation control system 90 which controls the adjustable elevation of support structure 80. In response, support structure 80 is lowered by any suitable elevation adjusting system such as that hereinabove described to transfer the entire weight of slabs 12 onto walking beam 22 while continuing to maintain the slabs 23 substantially uniformly at the elevation of plane P. Valve 64 is then suitably actuated to the retract (R) position to operate ram 68 in the retract mode and thereby move walking beam 22, and the slabs 12 carried thereby, through an increment of translational movement longitudinally of furnace 10 along plane P.

Support structure 80 is then once again elevated to position surfaces 96 at the elevation of plane P and in partial supporting contact with slabs 12 until a detector in the elevation control system of support structure 80, similar in all salient respects to the above described detector 82, detects sufficient hydraulic supply line pressure to lock the corresponding hydraulic control valve and thereby immovably fix support structure 80 with its supporting surfaces 96 at the elevation of plane P. Coincidentally, a signal indicating that support structure 80 is locked at the proper elevation may be provided to control system 90 to actuate, or permit or instruct the actuation of valve 52 via control line 92 to the retract (R) position thereby lowering walking beam 22 from the elevation of plane P and transferring the entire weight of slabs 12 onto surfaces 96 of support structure 80. With this, valve 64 may again be actuated to the extend (E) position to move walking beam 22 longitudinally in the opposite direction to begin a new cycle of walking motion.

It will be appreciated that only the basic elements of the disclosed power and control systems are shown, and those only in schematic form as the specific control elements needed are well known. It will also be appreciated that a large variety of alternative control systems, of greater of lesser complexity and offering greater or lesser degrees of automatic versus manual operation, may be utilized in practicing this embodiment of the invention. For example, sensor or detector 82 may be an electrical pressure sensitive switch which provides an electrical activating signal to operate a control valve, which in turn directs actuating fluid pressure to port 86 of valve 52. Alternatively, detector 82 may be a pressure actuated valve which diverts hydraulic pressure fluid flow directly to port 86 upon detection of a predetermined fluid pressure in conduit 51. Indeed, and although not necessarily desirable, the system could be as simple as a completely manual hydraulic control system in which detector 82 is a visual pressure indicator which is read by an operator who then actuates valve 52 manually in response to indication thereon of a given fluid pressure magnitude.

It will be further noted that the above described system is operable in substantially the same way if the support structure 80 is alternatively a separate system of walking beam structures having the ability to traverse longitudinally to and fro under the control of a hydraulic ram similar to ram 68 and related hydraulic circuitry and controls as disclosed. In such a system, the walking beam structure 18, and the support structure 80 both would operate in the manner of walking beam structures in phased relationship wherein one walking beam structure is supporting the slabs 12 and advancing them longitudinally within the furnace while the other walking beam structure is disengaged from slabs 12 and is retracting to prepare for a subsequent longitudinal movement of the slabs 12. In this alternative embodiment of the invention, of course, the advantage of maintaining the slabs 12 substantially at a uniform elevation is also realized.

From the above description, it may be seen that the invention provides the benefits of greatly improved energy efficiency and engineering design efficiency for a walking beam apparatus by eliminating unproductive work that would otherwise be expended in elevating the slabs of steel within the furnace before each increment of longitudinal translation, and by eliminating the impact loads which have conventionally occurred upon lowering the slabs again into engagement with the supporting structure at the end of each increment of longitudinal translation.

In FIGS. 7 and 8 there is shown an alternative embodiment of the invention wherein a mechanical stop 100, which is suitably anchored to the furnace base 44, is engageable with a confronting end portion 120 of beam 30 upon extension of hydraulic jack 38 to define the limit of elevation of the walking beam 22. The mechanical stop 100 thus is effective, in lieu of the detector 82 and related control circuitry, to permit elevation of walking beam 22 precisely to the level of plane P. As a further alternative, shown in FIGS. 7 and 8, a similarly anchored mechanical stop 104 is positioned for engagement with a cooperating stop 106 which is secured to beam 30 to limit upward movement of beam 30 and thereby define the uppermost limit of elevation for walking beam 22 in the same manner as above described with reference to the stop 100. FIG. 8 also discloses an alternative elevating structure in the form of a jack screw 108 which is supported on base 44 of the furnace and is suitably operable by any conventional power means to elevate the system of beams 30.

The use of mechanical stops 100 and/or 104 in lieu of hydraulic pressure detectors or other such controls is but one example of feasible alternative approaches to practice of this invention. The use of pressure sensing controls as above desribed, contemplates in effect a load responsive system whereas the use of mechanical stops as described contemplates a position responsive system. Of course, it is also conceivable that the two can be combined such that mechanical stops are used to limit elevation of the walking beam structure and fluid pressure detectors or similar controls are utilized to detect engagement of mechanical stops and discontinue extension of hydraulic jack 38. In similar fashion, the loads imposed on any alternative lifting apparatus by engagement of the mechanical stops can be detected by suitable controls which thereupon generate a signal to discontinue the elevation operation, such as, for example, by stopping powered operation of screw 108. It will be readily appreciated that the above characterized combinations and alternatives for elevating the walking beam structure precisely to a predetermined elevation are by no means exhaustive of the possibilities.

Additionally, it will be appreciated that the described mechanical stops constitute in effect a resistance which precludes upward motion of the walking beam structure beyond a predetermined limit. The engagement of the walking beam structure against under surfaces of the workpieces as in the first described embodiment hereinabove constitutes the same sort of resistance to upward movement of the walking beam structure beyond a predetermined limit. Accordingly, it will be seen that the above described alternative embodiments are comparable in many salient respects. Both rely on engagement of a member located substantially at a fixed elevation, and both are devised to discontinue operation of the elevating apparatus when such limit is reached and to then lock the walking beam apparatus at a specified, predetermined and repeatable elevation.

Further, from the above description, and with additional reference to FIGS. 2 through 6, the method of the present invention will be understood to include, inter alia, the steps of elevating the slab support surfaces 94 of a walking beam 22, as indicated by arrows A in FIG. 3 to engage workpieces supported on support surfaces 96 of support structure 80 at an elevation indicated by plane P. The support structure 80 is then lowered as indicated by arrows B in FIG. 4 to transfer the entire support of the workpieces onto walking beams 22. The walking beams 22 then are traversed along plane P as indicated by arrows C in FIG. 5 to advance the workpieces in the furnace, after which the support structure 80 is again elevated to bring surfaces 96 to the elevation of Plane P, as indicated in FIG. 6 by arrows D, to again engage the workpieces. Walking beam 22 then is lowered from the elevation of plane P as indicated by arrows E in FIG. 6 to transfer the entire support of the workpieces onto support structure 80, whereupon walking beam 22 may be retracted as indicated by arrows F in FIG. 2, to return them to the position of FIG. 3, and a new cycle of walking motion thus may begin.

According to this method or process, the work being traversed through the furnace remains at all times substantially at the elevation of Plan P. Of course, if both sets of work supports are walking beam structures, both will repeatedly cycle through the motions described for walking beam 22, in placed relationship.

According to the description hereinabove, it will be seen that I have invented a novel and useful improvement in a walking beam type transfer apparatus and in a method of transferring ponderously heavy articles such as steel slabs in a reheat furnace, through repeated increments of lateral translation. It will of course be appreciated that I have contemplated various alternative and moidified embodiments of the invention other than those hereinabove disclosed, and such would certainly also occur to those familiar with the art once apprised of my invention. Accordingly, it is my intent that the invention be construed broadly and limited only by the scope of claims appended hereto.

I claim:

1. In a walking beam apparatus which is adapted to transport articles in incremental steps through a given rectilinear path of travel, the combination comprising:

a pair of article supporting structures for alternately supporting such articles, at least one of said structures being a walking beam assembly;

drive means operatively associated with said structures to provide motive power for selectively moving each of said structures in vertical directions below a selected common vertical elevation whereat upwardly facing support portions of said structures reside substantially in a given plane;

means operable for limiting vertically upward movement of said structures to preclude movement thereof above said common vertical elevation, said means for limiting vertically upward movement of said structures includes means operable to detect attainment of said selected common vertical elevation by said structures, respectively, during vertically upward movement thereof; and control means operable upon detecting a change in force relative to said drive means upon said attainment of said common vertical elevation by either one of said supporting structures to lower the other of said supporting structures from said common vertical elevation whereby such articles are continuously supported substantially on said given plane throughout operation of said walking beam apparatus.

2. The combination as claimed in claim 1 wherein said means for limiting vertically upward movement of said structures includes mechanical stop means which are engaged by said structures during vertically upward movement thereof.

3. The combination as claimed in claim 1 wherein said detector means detects engagement of such articles by said structures, respectively.

4. The combination as claimed in claim 3 wherein the engagement of such articles detected by said detectors is partial supporting engagement of such articles by said structures, respectively.

5. The combination as claimed in claim 4 wherein said drive means is a hydraulic power system.

6. The combination as claimed in claim 5 wherein said detectors are pressure actuated detectors which sense the pressure of working fluid in said hydraulic power system.

7. The combination as claimed in claim 6 wherein said control means includes hydraulic flow control valve means.

8. In a walking beam apparatus wherein a first vertically moveable article supporting structure cooperates with a second vertically moveable article supporting structure to move articles through a given path of travel in incremental steps by supporting such articles alternately on one and the other of said supporting structures and by translating at least one of said supporting structures in a given horizontal direction each time such articles are supported thereon, the improvement comprising:
  means for maintaining such articles substantially at a uniform vertical elevation while alternately supporting such articles on one and then the other of said first and second supporting structures throughout translation of such articles in said given horizontal direction;
  detector means responsive to the transfer of essentially only a portion of the load of said articles from one to another of said first and second vertically moveable support structures for controlling said means for maintaining; and
  drive means for vertically moving said support structures.

9. In a method of transporting articles through a given, generally horizontal path of travel in incremental steps by supporting such articles alternately on a pair of vertically moveable support structures, at least one of which support structures is moveable in reciprocal fashion such that said at least one support structure is advanced in a given generally horizontal direction each time such articles are supported thereon, and after which such articles are transferred to the other of said support structures to be supported thereon while said one of said support structures is moved in the direction opposite said given direction preparatory to beginning a subsequent cycle of article support and horizontal movement, the improvement comprising:
  detecting the transfer of essentially only a portion of the load of said articles from one to the other of said vertically moveable support structures during alternate support thereby; and
  maintaining said articles substantially at a predetermined vertical elevation throughout transporting thereof through said given path of travel.

10. The improved method as claimed in claim 9 wherein support of said articles is transferred from one of said support structures to said other of said support structures by upward movement of said other of said support structures to at least engage said articles, followed by downward movement of said one of said support structures to move out of engagement with said articles.

11. The apparatus as claimed in claim 8 wherein said detector means includes means for generating a signal responsive to said load transfer.

12. The apparatus as claimed in claim 11 wherein said detector means detects engagement of such articles by said structures, respectively.

13. The apparatus as claimed in claim 12 wherein the engagement of such articles detected by said detectors is partial supporting engagement of such articles by said structures, respectively.

14. The apparatus as claimed in claim 11 wherein said drive means is a hydraulic power system.

15. The apparatus as claimed in claim 14 wherein said detectors are pressure actuated detectors which sense the pressure of working fluid in said hydraulic power system.

16. The apparatus as claimed in claim 15 wherein said control means includes hydraulic flow control valve means.

17. In a walking beam apparatus which is adapted to transport articles in incremental steps through a given rectilinear path of travel, the combination comprising:
  a pair of article supporting structures for alternately supporting such articles, at least one of said structures being a walking beam assembly:
  drive means operatively associated with said structures to provide motive power for selectively moving each of said structures in vertical directions below a selected common vertical elevation whereat upwardly facing support portions of said structures reside substantially in a given plane:
  means operable for limiting vertically upward movement of said structures to preclude movement thereof above said common vertical elevation; and
  control means operable upon detecting a change in force relative to said drive means upon said attainment of said common vertical elevation by either one of said supporting structures to lower the other of said supporting structures from said common vertical elevation whereby such articles are continuously supported substantially on said given plane throughout operation of said walking beam apparatus,
  wherein said means for limiting vertically upward movement of said structures includes means operable to detect attainment of said selected common vertical elevation by said structures, respectively, during vertically upward movement thereof, and other control means operable in response to operation of said detector means to discontinue vertically upward movement of said structures when the respective said structures attain said selected common vertical elevation.

18. The combination as claimed in claim 17 wherein said detector means detects engagement of such articles by said structures, respectively.

19. The combination as claimed in claim 18 wherein the engagement of such articles detected by said detectors is partial supporting engagement of such articles by said structures, respectively.

20. The combination as claimed in claim 19 wherein said drive means is a hydraulic power system.

21. The combination as claimed in claim 20 wherein said detectors are pressure actuated detectors which sense the pressure of working fluid in said hydraulic power system.

22. The combination as claimed in claim 21 wherein said control means includes hydraulic flow control valve means.

23. In a walking beam apparatus which is adapted to transport articles in incremental steps through a given rectilinear path of travel, the combination comprising:

a pair of article supporting structures for alternately supporting such articles, at least one of said structures being a walking beam assembly;

drive means operatively associated with said structures to provide motive power for selectively moving each of said structures in vertical directions below a selected common vertical elevation whereat upwardly facing support portions of said structures reside substantially in a given plane;

means operable for limiting vertically upward movement of said structures to preclude movement thereof above said common vertical elevation, said means for limiting vertically upward movement of said structures includes means operable to detect attainment of said selected common vertical elevation by said structures respectively, during vertically upward movement thereof, said detectors being operable to detect the weight of such articles on the respective said supporting structures; and control means operable upon said attainment of said common vertical elevation by either one of said supporting structures to lower the other of said supporting structures from said common vertical elevation whereby such articles are continuously supported substantially on said given plane throughout operation of said walking beam apparatus.

24. In a walking beam apparatus which is adapted to transport articles in incremental steps through a given rectilinear path of travel, the combination comprising:

a pair of article supporting structures for alternately supporting such articles, at least one of said structures being a walking beam assembly;

drive means operatively associated with said structures to provide motive power for selectively moving each of said structures in vertical directions below a selected common vertical elevation whereat upwardly facing support portions of said structures reside substantially in a given plane;

means operable for limiting vertically upward movement of said structures to preclude movement thereof above said common vertical elevation, said means for limiting vertically upward movement of said structures includes means operable to detect attainment of said selected common vertical elevation by said structures, respectively, during vertically upward movement thereof, said detectors being operable to detect the weight of such articles on the respective said supporting structures;

control means operable upon said attainment of said common vertical elevation by either one of said supporting structures to lower the other of said supporting structures from said common vertical elevation whereby such articles are continuously supported substantially on said given plane throughout operation of said walking beam apparatus; and other control means operable in response to operation of said detector means to discontinue vertically upward movement of said structures when the respective said structures attain said selected common vertical elevation.

* * * * *